United States Patent

Sugimoto et al.

[11] Patent Number: 5,667,717
[45] Date of Patent: Sep. 16, 1997

[54] METHOD OF PRODUCING CAST MAGNETIC SOFT FERRITE

[75] Inventors: Mitsuo Sugimoto, Tokyo; Akihiko Saito, Nagoya, both of Japan

[73] Assignee: Daido Tokushuko Kabushiki Kaisha, Nagoya, Japan

[21] Appl. No.: 304,655

[22] Filed: Sep. 9, 1994

Related U.S. Application Data

[63] Continuation-in-part of Ser. No. 17,987, Feb. 16, 1993, abandoned, which is a continuation of Ser. No. 902,495, Jun. 23, 1992, abandoned, which is a continuation of Ser. No. 763,692, Sep. 23, 1991, abandoned.

[51] Int. Cl.$^6$ .................. C04B 35/30; C04B 35/26; C04B 35/34
[52] U.S. Cl. .................. 252/62.62; 423/594; 264/299; 264/332; 264/337; 264/338
[58] Field of Search .................. 252/62.62; 423/594; 264/299, 332, 337, 338

[56] References Cited

U.S. PATENT DOCUMENTS 3,546,122  12/1970  Nishizawa et al. .................. 252/62.62

FOREIGN PATENT DOCUMENTS

| 532788 | 3/1993 | European Pat. Off. |
| 52-45094 | 4/1977 | Japan |
| 2-135711 | 5/1990 | Japan |
| 4-44303 | 2/1992 | Japan |

OTHER PUBLICATIONS

Sugimoto, "Ferrites, Proc. Int. Conf.", 1970 (Pub. 1971), University Park Press, Baltimore, Md. no month.

Sugimoto et al., "Ferrites, Proc. Int. Conf.", 1970 (Pub. 1971), University Park Press, Baltimore, Md. no month.

*Primary Examiner*—Melissa Bonner
*Attorney, Agent, or Firm*—Armstrong, Westerman, Hattori, McLeland & Naughton

[57] ABSTRACT

A method of producing magnetic soft ferrite of the general formula: $M_xZn_{1-x}O \cdot Fe_2O_3$ (M stands for one or more of Cu, Mn, Ni, Fe, Co and Mg; and X is in the range of 0.4–0.7) by melting and casting is disclosed. Melting is carried out under controlling evaporation of Zn-component in the material of the ferrite by disposing Zn-source around the material, sealing up the melting chamber as tight as possible, or under a pressurized gas atmosphere so as to obtain the product having uniform and precise composition.

3 Claims, 4 Drawing Sheets

METHOD OF PRODUCING CAST MAGNETIC SOFT FERRITE

This application is a continuation-in-part of application Ser. No. 08/017,987, filed Feb. 16, 1993; now abandoned, which is a continuation of application Ser. No. 07/902,495, filed Jun. 23, 1992, now abandoned, which is a continuation of application Ser. No. 07/763,692, filed Sep. 23, 1991, now abandoned.

BACKGROUND OF THE INVENTION

1. Field of the Invention

This invention relates to cast magnetic soft ferrite and a method of producing the same.

2. Prior Art

Magnetic soft ferrite products have been often employed as magnetic recording heads and magnetic cores of various equipments used at high frequency.

The conventional method of producing the magnetic soft ferrite is analogous to that for ceramics. General method of preparation is that a mixture of powdery raw materials of a magnetic soft ferrite or a compound as the starting material is sintered in a furnace at about 1100° to 1400° C. to get a product. At present three kinds of method, the dry method, coprecipitation method and atomization-thermal decomposition method are practical in the preparation of ferrites. According to those methods, it is difficult to exceed a certain limit of bulk density of the ferrite. Fluctuations of each given condition in producing processes exert an aggravating influences on the high frequency characteristics as well as on magnetic properties of the product. It is therefore difficult to provide a stable mass-production of the ferrite products having excellent characteristics.

Some products of magnetic soft ferrite are manufactured by cutting out from monocrystals. This cutting method is also influenced by the fluctuation of monocrystalline composition and segregation. In addition to these problems, this method costs a large expenditure in manufacturing and machining process. For this reason, the magnetic soft ferrite products formed of a monocrystalline material are used only in limited applications such as VTR magnetic heads.

One of the present inventors has invented a magnetic soft ferrite produced by melting and casting the compounds with a general formula such as $MO.Fe_2O_3$ (wherein M represents a divalent metal ion) or $M'O_{0.5}.Fe_{2.5}O_4$ (wherein M' represents a monovalent metal ion) and disclosed it with a method of producing the ferrite (Japanese Patent Application No. 63-289582).

In the first formula given above, for instance, M=Fe and Zn, a compound such as $Fe_{0.6}Zn_{0.4}O.Fe_2O_3$ is useful as a magnetic cores having a good magnetic characteristics, such as a large value of saturation magnetization and large initial permeability. When producing this soft ferrite by melting and casting, however, the inventors often encountered unforeseen difficulties to obtain a product having a desired composition.

SUMMARY OF THE INVENTION

It is the object of the present invention to provide, in the producing magnetic soft ferrite expressed by the general formula of $M_xZn_{1-x}O.Fe_2O_3$ by melting and casting, a method of producing a product having a desired composition by depressing fluctuations happened in the technical processes.

BRIEF EXPLANATION OF THE DRAWINGS

All the drawings represent the vertical sectional views illustrating the every principal portion of construction of an experimental equipment used for melting the mixture of raw materials of magnetic soft ferrite and casting the melt.

DETAILED EXPLANATION OF PREFERRED EMBODIMENTS OF THE INVENTION

Figure 1:
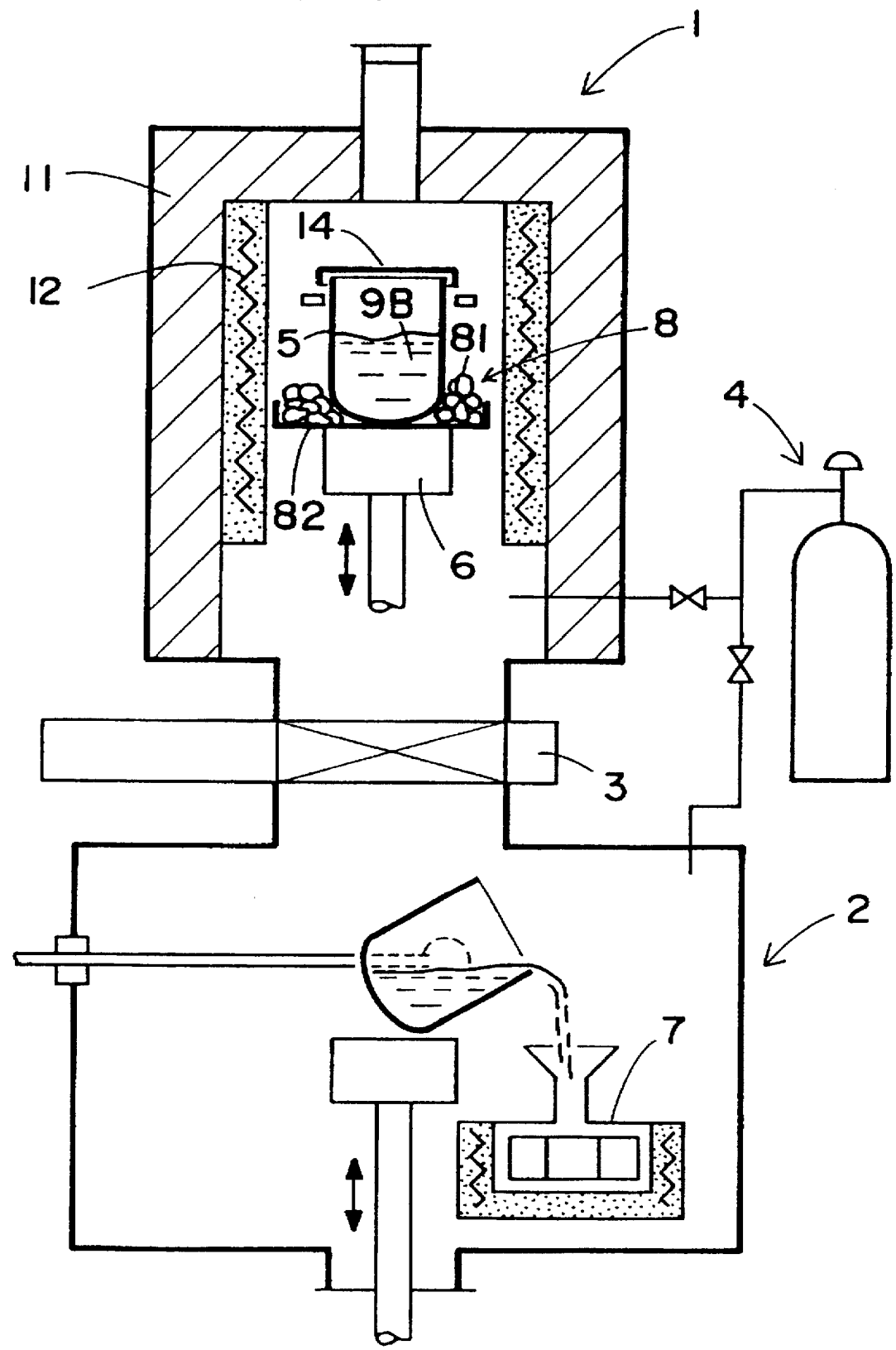
FIG. 1 shows the principle of heating and melting method by using an electric furnace.

In accordance with the first embodiment of the present invention, there is provided a method of producing casted magnetic soft ferrite, comprising the processes of heating a material consisting of the compound expressed by the general formula: $M_xZn_{1-x}O.Fe_2O_3$ (wherein M represents one or more of the metals selected from Cu, Mn, Ni, Fe, Co and Mg; and X is in the composition range of 0.4–0.7) or a mixture of the component oxides corresponding to the above mentioned formula at temperature of 1500°–1900° C.; while disposing a Zn supply source containing Zn or a Zn compound around the above mentioned starting material of the magnetic soft ferrite to allow existence of the surrounding gas containing Zn during the course of melting; and solidifying the obtained molten substance in a desired shape, typically, by pouring the molten substance into a mold.

As the Zn supply source it is preferable to use a Zn compound having a melting point higher than that of a ferrite (approximately 1600°–1700° C.) which is to be produced by melting. However, other Zn compounds each having a melting point lower than the melting points of the ferrites may also be used. Melting points (°C.) are shown by numerals in the parentheses [ ] marked therein, while a boiling point (°C.) is indicated by numerals in the parentheses ( ).

| | |
|---|---|
| Zn [420] (907) | |
| ZnO [to 2000, under pressure] | $ZnO \cdot Al_2O_3$ [1949] |
| $ZnO \cdot SiO_2$ [1526] | $2ZnO \cdot SiO_2$ [1580 or above] |
| $ZnO \cdot Fe_2O_3$ [1588] | $2ZnO \cdot TiO_2$ [1580 or above] |
| $ZnO \cdot WO_3$ [1580 or above] | $ZnSeO_3$ [529] |
| $K_{2O} - _{ZnO}\ _{2SiO2}$ [1427] | $3ZnO \cdot Nb_2O_5$ [1307] |
| ZnSe [>1100] | ZnTe [704] |
| $Zn_3P_2$ [371] | $Zn_3P_2$ [823] |
| $Zn_3As_2$ [698] | ZnSb [439] |

In accordance with the second embodiment of the present invention, in a method of producing magnetic soft ferrite expressed by the general formula: $M_xZn_{1-x}O.Fe_2O_3$ (wherein M represents one or more metals selected from Cu, Mn, Ni, Fe, Co and Mg) by melting and casting, there is provided a method of producing comprising the processes of heating a material consisting of the compound of the above formula or a mixture of the component oxides corresponding to the above composition; while sealing up the melting chamber as tight as possible to suppress evaporation of Zn contained in the molten material, and solidifying the melt substance into the ferrite having a desired shape.

In accordance with the third embodiment of the present invention, in a method of producing magnetic soft ferrite expressed by the general formula: $M_xZn_{1-x}O.Fe_2O_3$ (wherein M represent one or more metals selected from Cu, Mn, Ni, Fe, Co and Mg; and X is in the composition range of 0.4–0.7) by melting and casting, there is provided a method comprising the processes of heating a material consisting of the compound of the above formula or a mixture of the component oxides corresponding to the above composition; using a surrounding gas which does not virtually exert a harmful influence on the ferrite as the atmosphere of the melt; keeping the gas in a pressurized state so as to suppress evaporation of Zn in the molten material; and solidifying the melt into the ferrite having a desired shape.

In accordance with the forth embodiment of the present invention, which is the combination of the first and the second embodiments of the present invention, in a method of producing magnetic soft ferrite expressed by the general formula: $M_xZn_{1-x}O.Fe_2O_3$ (wherein M represents one or more of metals selected from Cu, Mn, Ni, Fe, Co and Mg; and X is in the composition range of 0.4–0.7) by melting and casting, there is provided a method comprising the processes of heating a compound with the composition corresponding to the formula or a mixture of the component oxides corresponding to the above mentioned formula; while disposing a Zn supply source consists of Zn or Zn compound around the material to allow existence of the surrounding gas containing Zn during the course of melting; using a surrounding gas which does not virtually exert a harmful influence on the ferrite material throughout the process of melting; keeping the gas in a pressurized state so as to suppress evaporation of the Zn contained in the molten material; and solidifying the melt into the ferrite having a desired shape.

In carrying out the casting, the description of the mold materials in the previous invention is applicable also to the present invention. More specifically, a material of the mold is selected preferably from Pt-Rh alloys or Ir alloys or sintered bodies of lithium aluminium silicide, magnesium aluminium silicide, SiC, $Si_3N_4$, $Si_4Al_2O_2N_6$, $TiB_2$, $ZrB_2$, BN, $B_4C$, TiC, ZrC, TiN, ZrN, $TiO_2$ or $Al_2O_3$.

The mold is preheated at a temperature ranging from 200° C. to 800° C. preparatory to its use, and after the molten substance is injected, it is appropriate to cool the mold at a rate of 300°–1800° C./hr to solidify the melt.

To facilitate the separation of the solidified ferrite's from the mold after casting, it is recommended to coat the inner face of the mold with a porous ceramics, with a ceramics which becomes porous by heating, or with a ceramics which breaks down by oxidation.

When carrying out this invention, as will be seen in the Examples which are described later, a variety of attempts can be made.

It has been found that the fluctuatation of the chemical composition of the product when producing the ferrite of $M_xZn_{1-x}O.Fe_2O_3$ by melting and casting is due to the fact that vapor pressure of Zn is very high and it is apt to volatil at high temperatures. Then, we have supplied Zn from a Zn source in order to suppress the evaporation by holding the Zn partial pressure in the surrounding gas atmosphere to a constant. The Zn partial pressure in the surrounding gas atmosphere should have a magnitude enough to counteract the Zn partial pressure caused by Zn evaporation from the ferrite material. Hence, it is required that the materials of Zn supply source are selected depending on the composition of the ferrite material to be melted and the temperature at which the ferrite material is melted. Besides, it is preferable to provide the Zn supply source for supplying Zn having a sufficient quantity for the total amount of the ferrite material to be melted. As the result of a variety of experiments, it was found that the use of Zn supply source having a higher melting point results in a decrease of Zn loss caused by the evaporation. Therefore, these materials with a higher melting point are useful. Also, it was found that, even in the case of using the Zn supply source having a lower melting point, the Zn supply source can be effectively used by strictly controlling the supply quantity so that it may not be excessive compared to the amount of the ferrite material or by releasing out the excessive vapor of Zn by a certain way.

In view of the above facts it is preferable to use a combination of one or more of Zn-compounds having melting points higher than those of the ferrites, more specifically, ZnO, $ZnO.Al_2O_3$, $ZnO.Fe_2O_3$, $2ZnO.SiO_2$, $2ZnO.TiO_2$ and $ZnO.WO_3$, and one or more of Zn-compounds having melting points lower than those of the ferrites, more specifically, $ZnO.SiO_2$, $K_2O.ZnO.SiO_2$, $2CaI.ZnO.2SiO_2$, $3ZnO.Nb_2O_5$, $ZnSeO_3$, ZnSb, ZnTe, $Zn_3N_2$, $Zn_3P_2$ and $Zn_3As_2$.

It will be easily understood that, when the melting is carried out, the method of sealing up the melting chamber or that of covering the crucible for melting is effective for suppressing the evaporation of Zn. An upper space in the crucible is preferably as small as possible. That is, reducing the upper space in the crucible serves to minimize the influences on the change of composition of the product even if the Zn volatiles from the material in the crucible.

Putting the gas atmosphere surrounding the melt under the pressurized condition results in a large effect in terms of suppresing the volatilization of the Zn. As the atmosphere gas, $O_2$, $N_2$, Ar and air or a mixed gas thereof at any ratios can be used. The effect of pressure can be seen even with approximately 1–2 kg/cm², however, it becomes more conspicuous with a higher pressure. It is, however, necessary to cope with a various problems when the pressure in the melting equipment increases up to an extremely high pressure. The present inventors constructed an experimental equipment which works at a pressure up to 30 kg/cm², and carried out various tests related to this invention to clarify the further detail.

EXAMPLES

Examples 1–6

Control Examples

The experimental equipment as shown in FIG. 1. was constructed, and melting and casting magnetic soft ferrites were carried out.

In the Figure, the numeral (1) represents a melting chamber; (2) a casting chamber; (3) a flat valve for sectioning the two chambers; and (4) a means for adjusting atmospheres, especially, gas pressure in the two chambers. The melting cheer is an electric furnace lined with a refractory thermal insulator (11) and equipped with heater (12). Temperatures in the furnace is adjustable up to 1800° C. so that a raw material in a Pt-Rh alloy crucible (5) may be melted to obtain a molten magnetic soft ferrite (9B). Designated with (8) is a means for supplying Zn consisting of a Zn supply source (81) and a container (82). The container (82) is composed of an refractory material which is stable at high temperatures but does not react to the Zn supply source (81). Preferably, however, a Pt-Rh alloy is used. Numeral (14) indicates a lid of the crucible, which is constructed to close the crucible as tight as possible.

The molten substance drops down into the casting chamber by manipulating a crucible support board. The molten substance is then poured into a mold (7) by inclining the crucible (5) with an inclining bar. The mold is equipped with a heater and is therefore preheated at a desired temperature, and is also capable of controlling cooling speed.

The raw materials of magnetic soft ferrites having compositions shown in Table 1 were melted and cast under the conditions stated in the Table by employing the experimental equipment described above. The cast products were in the form of round bars. The mold used was made of Pt-Rh alloy, or SiC and or BN.

The inner face of the mold was coated with porous ceramics or oxidation-degradating ceramics. These coating materials have been found to be effective to take solidified ferrite product of the mold.

The magnetic properties of the obtained casted product were measured. At the same time Zn contents of the products were determined so as to ascertain whether the compositions thereof were expected. The results are shown in Table 2.

Example 7

Powder of the magnetic soft ferrite used as the raw material in Example 1 was mixed and headed with a small amount of binder composed mainly of polyvinyl butyral. The headed substance is pressed in a cylindrical shape having a diameter of 15 mm.

Figure 2:
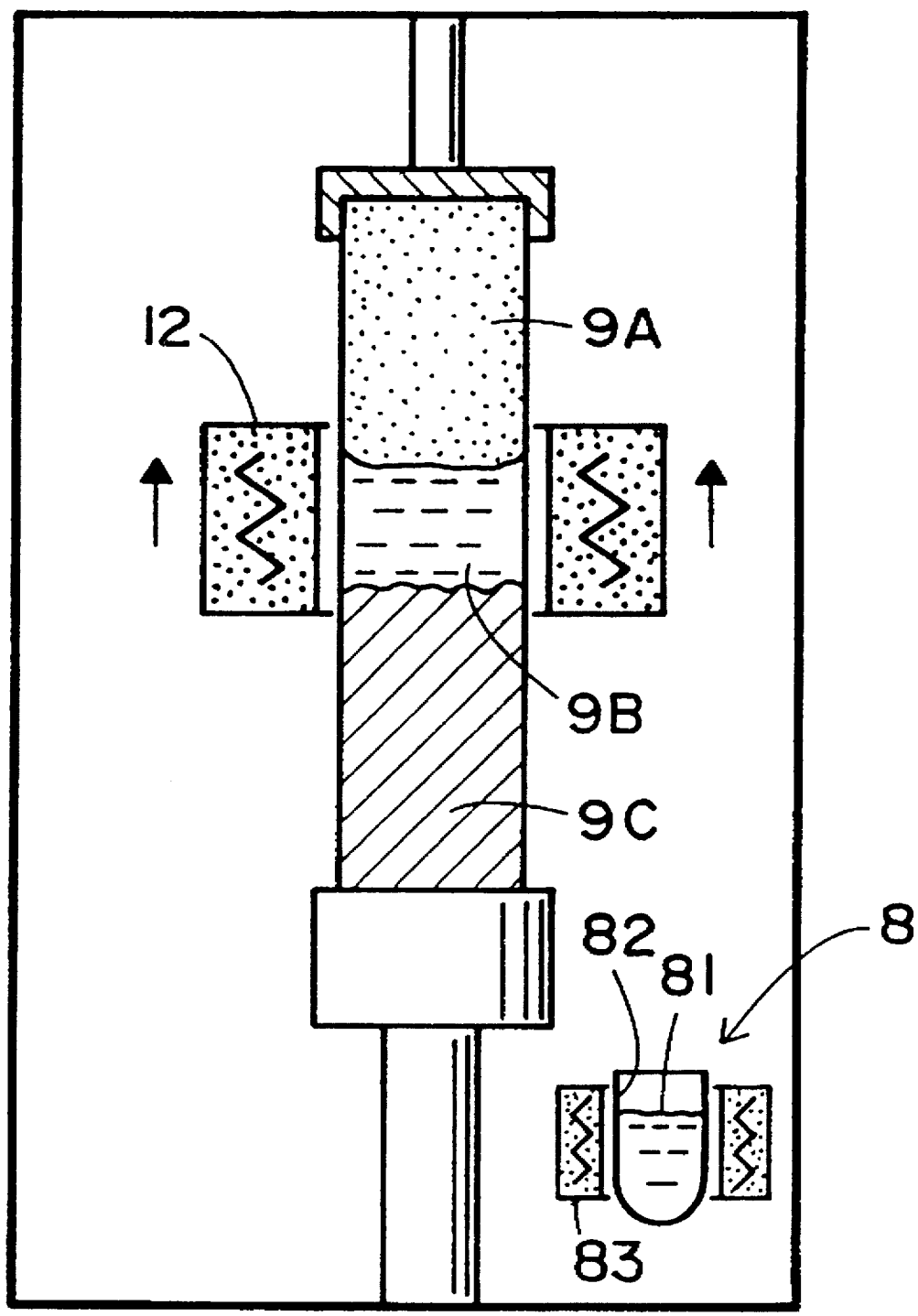
FIG. 2 shows the principle of suspension-melting method.

The compacted body was heated by an equipment shown in FIG. 2 and melted by suspension melting method. More specifically, as can be seen in the Figure, a compact of a ferrite material (9A) was fixed, and a ring-shaped heater (12) surrounding the compact moved slowly upwards from under. The movement of a melted zone of the ferrite (9B) was always accompanied by the movement of heater, and thus, the solidified magnetic soft ferrite (9C) remains there. When performing this suspension melting, as illustrated in the Figure, the Zn supply means (8) was provided, and the surrounding gas atmosphere was adjusted to have an appropriate partial pressure of Zn vapor. The Zn supply means (indicated by (81), $ZnO.Fe_2O_3$ was also used in this example) in the container (82) was heated by a heater (83) at a suitable temperature. The Zn partial pressure in the surrounding gas atmosphere can be thereby controlled.

According to this method, the magnetic soft ferrite product solidified without being cast. The ferrite product was obtained in a cylindrical shape having a diameter a little smaller than that of the original compact.

Example 8

Figure 3:
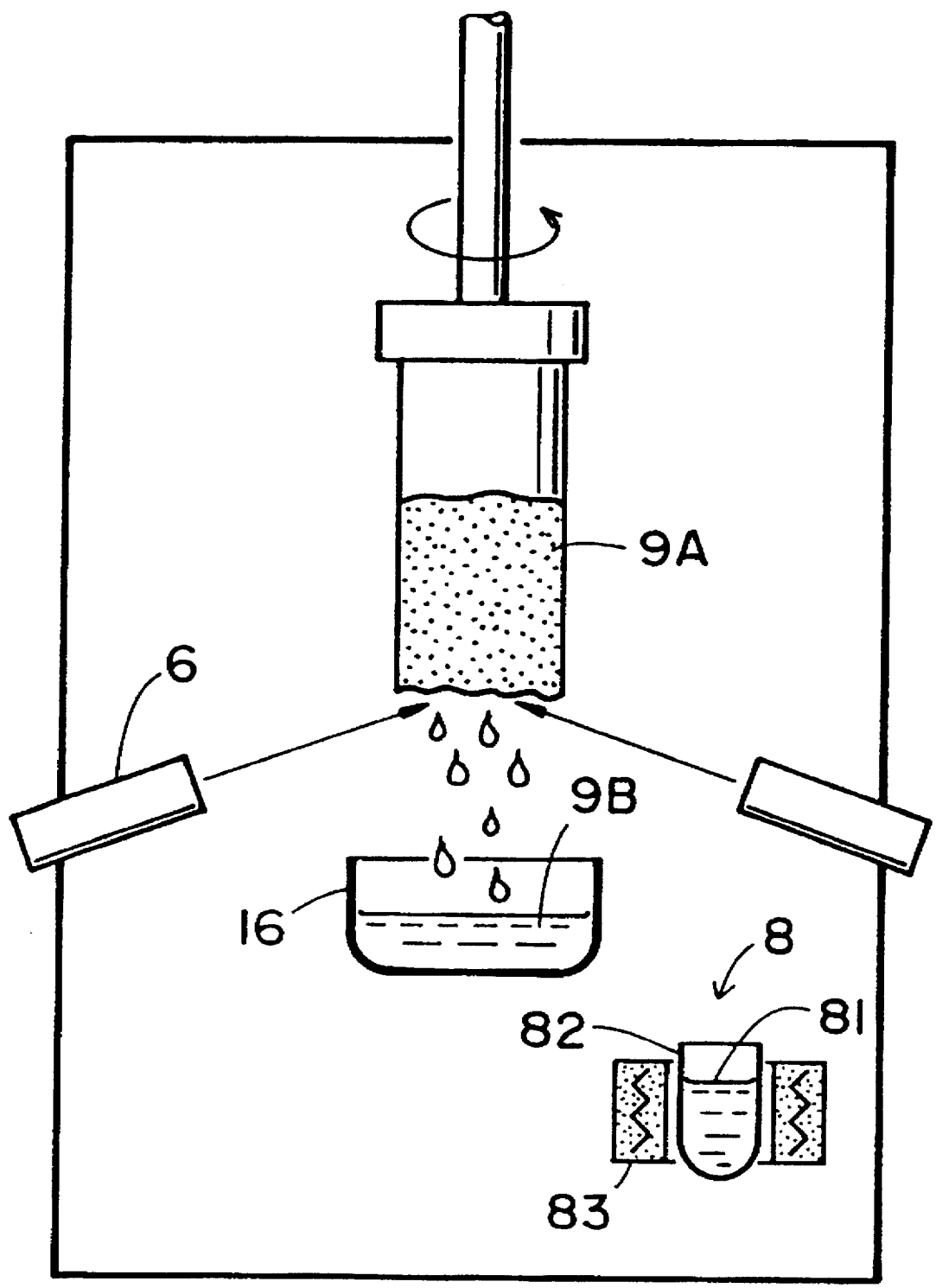
FIG. 3 shows the principle of the electron beam melting method.

The compact of the same magnetic soft ferrite material as used in Example 7 was melted with the equipment illustrated in FIG. 3 to obtain a molten ferrite. Referring to FIG. 3, the numeral (6) represents an electron beam irradiation means. Heating energy of electron beams was given to the ferrite material (9A) to melt it, and the melted ferrite dropped down. As a result, the molten ferrite (9B) was formed in a container (16) made of a Pt-Rh alloy. Also in this case, the Zn supply means (8) was used.

If the heating energy is enough to melt the ferrite material, infrared rays may be used as a melting means in place of the electron beams.

Example 9

Figure 4:
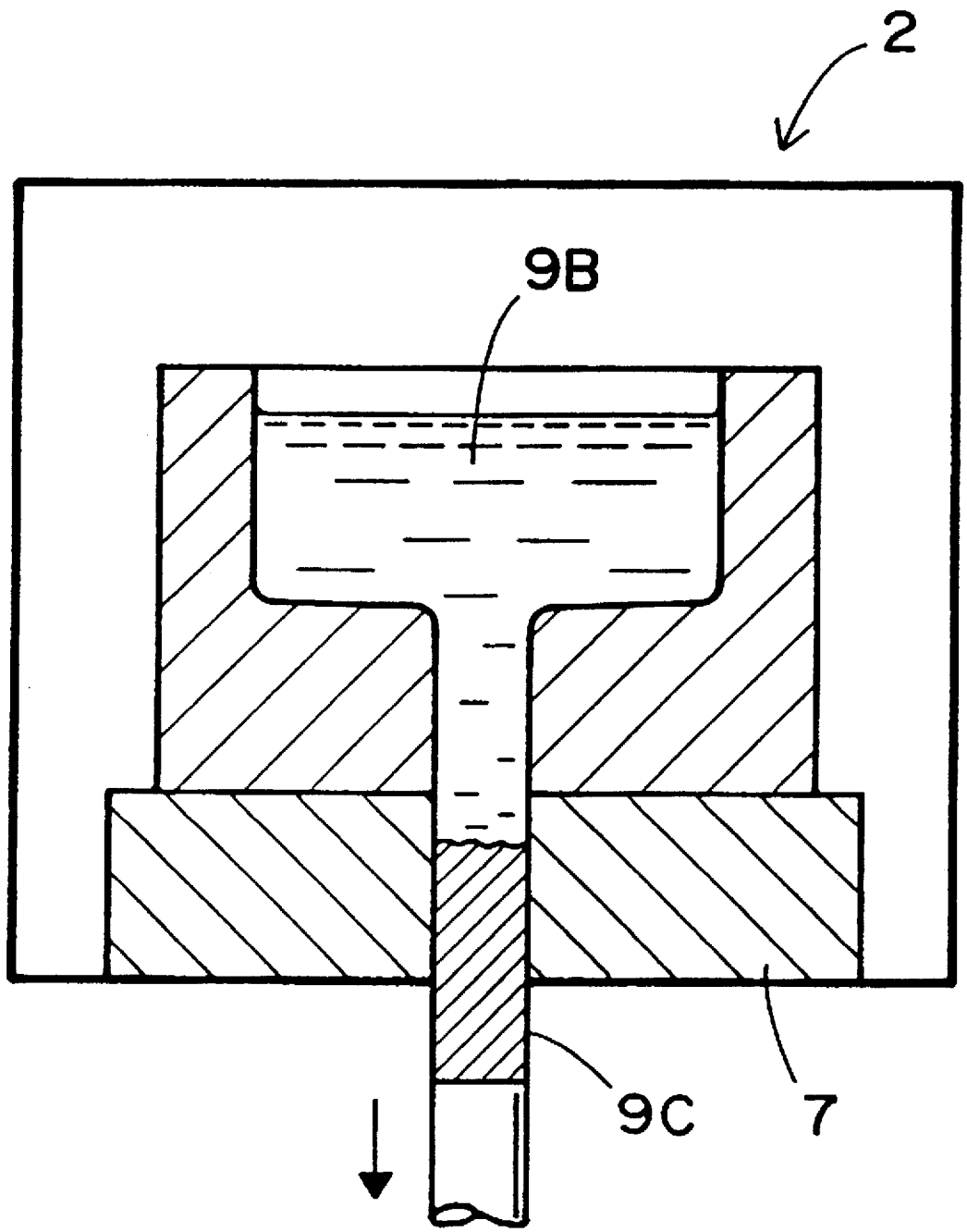
FIG. 4 shows the principle of the continuous casting.

The molten magnetic soft ferrite continuously formed in Example 8 was continuously casted with an equipment illustrated in FIG. 4. At the beginning of forming the molten ferrite, a ferrite bar made of the same material was inserted in the bottom of the casting chamber, and when the molten ferrite accumulated to a certain amount, this bar was slowly pulled down. A bar shaped cast body, which was a ferrite solid body (9C) pursuant to the hole section of the mold (7), was obtained.

Tables 1 and 2 show the experiments and results of Examples 7–9 together with those of Examples 1–6.

As described above, the present invention facilitates, in the case where the magnetic soft ferrite of $M_xZn_{1-x}O.Fe_2O_3$ is produced by casting, to control the Zn content of the ferrite and obtain a product with a uniform composition and realizing the lowest fluctuations of magnetic properties.

The products made by the casting according to the present invention have higher specific densities than that of the products made by the conventional power metallurgy. It has been ascertained that the ferrite products with very fine crystalline grains are excellent in terms of the magnetic properties and high frequency characteristics. Besides, the process of producing according to this invention is more simplified than in the conventional methods. Control of the process is easy, and hence, the present method is characterized by the fact that the products with very small variation of quality can be offered at reduced costs. Therefore, the present invention with new characteristics greatly contributes to development in the ferrite industry.

TABLE 1

| Division | Ferrite Composition $M_xZn_{1-x}O.Fe_2O_3$ | Means for Suppressing Zn Evaporation | Gas Atmosphere | Melting Condition Temp. Period |
|---|---|---|---|---|
| Example 1 | $Fe_{0.516}Zn_{0.484}O.Fe_2O_3$ | $ZnO.Fe_2O_3$ used as Zn supply source | Ar | 1680° C., 30 min |
| Control 1 Example 2 | $Mn_{0.518}Zn_{0.482}O.Fe_2O_3$ | — $ZnO.Fe_2O_3$ used as Zn supply source | $O_2$ | 1700° C., 30 min or 1500° C., 1 h |
| Control 2 Example 3 | $Mn_{0.578}Zn_{0.482}O.Fe_2O_3$ | — $ZnO.Fe_2O_3$ and $K_2O.ZnO.SiO_2$ used as Zn supply sources | $N_2$ | 1700° C., 30 min |
| Example 4 | $Fe_{0.516}Zn_{0.484}O.Fe_2O_3$ | lid of melting crucible closed | Ar | 1680° C., 30 min |
| Control 3 Example 5 | | — pressurized atmosphere (3 atm) | | |

TABLE 1-continued

| Division | Ferrite Composition $M_xZn_{1-x}O.Fe_2O_3$ | Means for Suppressing Zn Evaporation | Gas Atmosphere | Melting Condition Temp. Period |
|---|---|---|---|---|
| Example 6 | $Fe_{0.516}Zn_{0.484}O.Fe_2O_3$ | $ZnO.Fe_2O_3$ used as Zn supply source pressurized atmosphere (3 atm) | Ar | 1680° C., 30 min |
| Control 4 | — | | | |
| Example 7 | $Fe_{0.516}Zn_{0.484}O.Fe_2O_3$ | $ZnO.Fe_2O_3$ used as Zn supply source | Ar | about 1650–1700° C., about 20 min (melting zone residence time) |
| Example 8, 9 | $Fe_{0.516}Zn_{0.484}O.Fe_2O_3$ | $ZnO.Fe_2O_3$ used as Zn supply source | Ar | about 1600° C. |

TABLE 2

| | Amount of Zn in ferrite (%) | | Magnetization |
|---|---|---|---|
| | Expected Value | Observed Value | Value measured at 10 kOe (emu/g) |
| Example 1 | 11.1 | 11.2 | 96 |
| Control 1 | | 0.2 | 70 |
| Example 2 | 12.5 | 12.0 | 101 |
| Control 2 | | 0.1 | 56 |
| Example 3 | 12.5 | 12.2 | 104 |
| Example 4 | 11.1 | 10.9 | 92 |
| Control 3 | | 0.2 | 61 |
| Example 5 | | 11.0 | 110 |
| Example 6 | 11.1 | 11.0 | 115 |
| Control 4 | | 0.5 | 72 |
| Example 7 | 11.9 | 11.9 | 109 |
| Example 8, 9 | | 11.0 | 105 |

We claim:

1. A method of producing magnetic soft ferrite expressed by the general formula: $M_xZn_{1-x}O\ Fe_2O_3$ wherein M represents one or more of the materials selected from Cu, Mn, Ni, Fe, Co and Mg; and X is in the composition range of 0.4–0.7, by melting and casting, comprising the processes of heating a material consisting of the compound with the above formula or a mixture of the component oxides corresponding to the above composition to a temperature of 1500°–1900° C. to melt; while disposing a Zn supply source consisting of Zn or a Zn compound around the above mentioned material to allow existence of a surrounding gas containing Zn so as to suppress evaporation of Zn in the molten material, the surrounding gas containing Zn being at a pressure of 1–3.1 kg/cm²; and solidifying the melt by casting the melt into a mold having a desired shape preheated to a temperature of 200°–800° C. and cooling under a cooling rate of 300°–1800° C./hr.

2. A method of producing magnetic soft ferrite according to claim 1, wherein the surrounding gas containing Zn includes a gas selected from air, argon, nitrogen and a mixture of two or more of these gases.

3. A method of producing magnetic soft ferrite according to claim 1, wherein the surrounding gas is at a pressure of about 1 to 2 kg/cm².

* * * * *